(12) United States Patent
Ito et al.

(10) Patent No.: US 11,808,373 B2
(45) Date of Patent: Nov. 7, 2023

(54) PIEZOELECTRIC VALVE AND METHOD FOR MANUFACTURING PIEZOELECTRIC VALVE

(71) Applicants: SATAKE CORPORATION, Tokyo (JP); MECHANO TRANSFORMER CORPORATION, Tokyo (JP)

(72) Inventors: Takafumi Ito, Tokyo (JP); Tadashi Matsushita, Tokyo (JP); Toshiro Higuchi, Tokyo (JP); Sze Keat Chee, Tokyo (JP); Yoshinobu Mizuno, Shimotsuma (JP); Toshitada Hirata, Shimotsuma (JP)

(73) Assignees: SATAKE CORPORATION, Tokyo (JP); MECHANO TRANSFORMER CORPORATION, Tokyo (JP)

( * ) Notice: Subject to any disclaimer, the term of this patent is extended or adjusted under 35 U.S.C. 154(b) by 81 days.

(21) Appl. No.: 17/622,620

(22) PCT Filed: Feb. 28, 2020

(86) PCT No.: PCT/JP2020/008392
§ 371 (c)(1),
(2) Date: Dec. 23, 2021

(87) PCT Pub. No.: WO2020/261645
PCT Pub. Date: Dec. 30, 2020

(65) Prior Publication Data
US 2022/0356958 A1 Nov. 10, 2022

(30) Foreign Application Priority Data
Jun. 28, 2019 (JP) ................... 2019-121551

(51) Int. Cl.
*F16K 31/00* (2006.01)
*F16K 27/02* (2006.01)
*F16K 1/54* (2006.01)

(52) U.S. Cl.
CPC .............. *F16K 31/008* (2013.01); *F16K 1/54* (2013.01); *F16K 27/029* (2013.01); *F16K 31/007* (2013.01); *F16K 2200/50* (2021.08)

(58) Field of Classification Search
CPC .......... F16K 1/54; F16K 27/02; F16K 27/029; F16K 27/04; F16K 31/004; F16K 31/007;
(Continued)

(56) References Cited

U.S. PATENT DOCUMENTS 7,026,746 B2 * 4/2006 Audren ................ F16K 31/007
310/323.17
8,181,932 B2 * 5/2012 Matsumoto .......... F16K 31/007
251/61.4

(Continued)

FOREIGN PATENT DOCUMENTS

JP 2003-164985 A 6/2003
JP 2013-124695 A 6/2013
(Continued)

OTHER PUBLICATIONS

Extended European Search Report dated Jun. 23, 2023 in Application No. 20830664.7.

*Primary Examiner* — Matthew W Jellett
(74) *Attorney, Agent, or Firm* — Faegre Drinker Biddle & Reath LLP

(57) ABSTRACT

A piezoelectric valve includes: a valve main part including a gas pressure chamber receiving compressed gas supplied from outside; a plate inside the valve main part, and an actuator fixed to the plate and inside the valve main part, which is a case with an opening on a front surface. The plate includes a gas discharge path and a valve seat coming into
(Continued)

contact with a valve element of the actuator opening and closing the gas discharge path. A lid member that closes the opening of the case has a gas discharge opening communicating with the gas discharge path of the plate; is welded and fixed to a front surface of the plate, where the gas discharge path opens, on an annular welded part surrounding the gas discharge opening; and is welded and fixed to an end surface of the case on an annular welded part on the outer peripheral part.

10 Claims, 8 Drawing Sheets

(58) Field of Classification Search
CPC .... F16K 31/008; F16K 31/02; F16K 2200/50; H02N 2/04; H02N 2/043; H10N 30/20
See application file for complete search history.

(56) References Cited

U.S. PATENT DOCUMENTS

| | | | |
|---|---|---|---|
| 9,097,359 B2* | 8/2015 | Ito | F16K 31/02 |
| 10,215,300 B2* | 2/2019 | Reith | F16K 31/004 |
| 2003/0098295 A1 | 5/2003 | Kawamoto et al. | |
| 2014/0339141 A1 | 11/2014 | Ito et al. | |
| 2018/0250714 A1 | 9/2018 | Ito et al. | |
| 2020/0144477 A1 | 5/2020 | Chee et al. | |

FOREIGN PATENT DOCUMENTS

| | | |
|---|---|---|
| JP | 2016-61412 A | 4/2016 |
| JP | 2017-51894 A | 3/2017 |
| WO | WO-2019/009035 A1 | 1/2019 |

* cited by examiner

PIEZOELECTRIC VALVE AND METHOD FOR MANUFACTURING PIEZOELECTRIC VALVE

CROSS REFERENCE TO RELATED APPLICATIONS

This application is a National Stage of International Application No. PCT/JP2020/008392, filed Feb. 28, 2020, and claims the benefit of Japanese Patent Application No. 2019-121551, filed Jun. 28, 2019, the entire contents of each of which are incorporated herein by reference.

TECHNICAL FIELD

The present invention relates to a piezoelectric valve that utilizes displacement of a laminated piezoelectric element to open and close a valve, and a method of manufacturing the piezoelectric valve.

BACKGROUND ART

Conventionally, there is known a piezoelectric valve that utilizes displacement of a laminated piezoelectric element to open and close the valve and discharge compressed gas (see, for example, Patent Literatures 1 and 2).

The piezoelectric valve utilizes the characteristics of a laminated piezoelectric element having high-speed response performance. In addition, the piezoelectric valve includes a displacement enlargement mechanism that enlarges a small displacement of the laminated piezoelectric element based on the principle of leverage.

The piezoelectric valves described in Patent Literatures 1 and 2 include a valve main part including a gas pressure chamber that receives compressed gas supplied from an outside; a valve seat plate disposed inside the valve main part, a valve element, and a laminated piezoelectric element that generates a driving force required for the operation of the valve element, as a displacement. In addition, the piezoelectric valve includes an actuator that: has a displacement enlargement mechanism for enlarging the displacement of the laminated piezoelectric element and causing the enlarged displacement to act on the valve element; is fixed on both sides of the valve seat plate; and is disposed inside the valve main part together with the valve seat plate. Furthermore, the valve main part is a case whose front surface opens, and the opening of the case is closed by a lid member provided on the front surface of the valve seat plate.

Meanwhile, the piezoelectric valve described in Patent Literature 1 has a structure in which the lid member, which is integrally provided for each valve seat plate, is attached to the front surface of the case of the valve main part with screws via an intermediate spacer and gasket. Therefore, as the external dimensions increase, air leakage may occur more.

In addition, the piezoelectric valve described in Patent Literature 1 has a structure in which the lid member is attached to the front surface of the case of the valve main part with screws via an intermediate spacer and a gasket for each valve seat plate. Therefore, the assembly may be complicated.

On the other hand, the piezoelectric valve described in Patent Literature 2 has a structure in which the lid member provided on the front surface of the valve seat plate is fitted into the case opening of the valve main part to be attached. Therefore, if the external dimensions are limited, the opening of the case cannot take a sufficient wall thickness. As a result, the rigidity of the opening of the case is insufficient so that it may swell due to the supply pressure of the compressed gas, causing air leakage.

In addition, the piezoelectric valve described in Patent Literature 2 has a structure in which the front protruding portion of the valve seat plate is fitted to be attached into the opening formed in the lid member. Therefore, air leakage may occur from the opening of the lid member.

Furthermore, the piezoelectric valve described in Patent Literature 2 has a structure in which a front protruding portion of the valve seat plate is fitted into the opening of the lid member, and pins are inserted into members hanging from the four corners of the lower surface of the lid member to prevent the valve seat plate from coming off. Therefore, the assembly may be complicated.

CITATION LIST

Patent Literature

Patent Literature 1

Japanese Patent Laid-Open No. 2013-124695

Patent Literature 2

Japanese Patent Laid-Open No. 2017-51894

SUMMARY OF INVENTION

Technical Problem

Therefore, an object of the present invention is to provide a piezoelectric valve that can prevent air leakage and can be easily assembled, and a method of manufacturing the piezoelectric valve.

Solution to Problem

In order to achieve the above object, one aspect of the present invention is a piezoelectric valve including:
a valve main part including a gas pressure chamber that receives compressed gas supplied from an outside;
a plate disposed inside the valve main part; and
an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element,
wherein the valve main part is a case with an opening on a front surface;
the plate is provided with the gas discharge path and a valve seat with which the valve element of the actuator comes into contact, the actuator opening and closing the gas discharge path; and
a lid member that closes the opening of the case has a gas discharge opening communicating with the gas discharge path of the plate, is welded and fixed to a front surface of the plate on an annular welded part surrounding the gas discharge opening, and is welded and fixed to an end surface of the case on an annular welded part on an outer peripheral part, the front surface of the plate being a surface where the gas discharge path opens.

The piezoelectric valve of another aspect of the present invention is preferably such that:

the plate is molded with wiring for supplying power to the laminated piezoelectric element of the actuator; and the lid member further includes a wiring opening from which the wiring exposed on the front surface of the plate extends forward, and is welded and fixed to the front surface of the plate on an annular welded part surrounding the gas discharge opening and an annular welded part surrounding the wiring opening.

In order to achieve the above object, another aspect of the present invention is a piezoelectric valve including:

a valve main part including a gas pressure chamber that receives compressed gas supplied from an outside;

a plate disposed inside the valve main part; and an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element, wherein the valve main part is a case with an opening on a front surface;

the plate is provided with the gas discharge path and a valve seat with which the valve element of the actuator comes into contact, and is molded with wiring for supplying power to the laminated piezoelectric element of the actuator, the actuator opening and closing the gas discharge path; and a lid member that closes the opening of the case includes a gas discharge opening and a wiring opening, is welded and fixed to the front surface of the plate on an annular welded part surrounding the gas discharge opening and the wiring opening, and is welded and fixed to an end surface of the case on an annular welded part on an outer peripheral part, the gas discharge opening communicating with the gas discharge path of the plate, the wiring opening being an opening from which the wiring exposed on a front surface of the plate extends forward, the front surface of the plate being a surface where the gas discharge path opens.

The piezoelectric valve of another aspect of the present invention is preferably such that the lid member is welded and fixed to the front surfaces of a plurality of the plates.

In addition, in order to achieve the above object, another aspect of the present invention is a method of manufacturing a piezoelectric valve, the valve including:

a valve main part including a gas pressure chamber that receives compressed gas supplied from an outside;

a plate disposed inside the valve main part; and an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element, the method comprising:

configuring the valve main part to be a case with an opening on a front surface;

providing the plate with the gas discharge path and a valve seat with which the valve element of the actuator comes into contact, the actuator opening and closing the gas discharge path;

providing a lid member with a gas discharge opening that communicates with the gas discharge path of the plate, the lid member closing the opening of the case; and irradiating the lid member with a laser light from above along an annular locus surrounding the gas discharge opening to weld and fix the lid member to a front surface of the plate where the gas discharge path opens, disposing the plate inside the valve main part, and subsequently irradiating the lid member with a laser light from above along an annular locus on an outer peripheral part of the lid member to weld and fix the lid member to an end surface of the case.

Preferably, the method of manufacturing a piezoelectric valve according to another aspect of the present invention further includes:

molding the plate with the wiring for supplying power to the laminated piezoelectric element of the actuator;

further providing the lid member with a wiring opening from which the wiring exposed on the front surface of the plate extends forward; and irradiating the lid member with a laser light from above along the annular locus surrounding the gas discharge opening and an annular locus surrounding the wiring opening to weld and fix the lid member to the front surface of the plate where the gas discharge path opens, and disposing the plate inside the valve main part.

In order to achieve the above object, another aspect of the present invention is a method of manufacturing a piezoelectric valve, the valve including:

a valve main part including a gas pressure chamber that receives compressed gas supplied from an outside;

a plate disposed inside the valve main part; and an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element, the method comprising:

configuring the valve main part to be a case with an opening on a front surface;

providing the plate with the gas discharge path and a valve seat with which the valve element of the actuator comes into contact, and molding the plate with wiring for supplying power to the laminated piezoelectric element of the actuator, the actuator opening and closing the gas discharge path;

providing a lid member with a gas discharge opening and a wiring opening, the lid member closing the opening of the case, the gas discharge opening communicating with the gas discharge path of the plate, the wiring opening being an opening from which the wiring exposed on a front surface of the plate extends forward; and irradiating the lid member with a laser light from above along an annular locus surrounding the gas discharge opening and the wiring opening to weld and fix the lid member to the front surface of the plate where the gas discharge path opens, disposing the plate inside the valve main part, and subsequently irradiating the lid member with a laser light from above along an annular locus on an outer peripheral part of the lid member to weld and fix the lid member to an end surface of the case.

The method of manufacturing a piezoelectric valve according to another aspect of the present invention is preferably such that the lid member is welded and fixed to the front surfaces of a plurality of the plates.

Advantageous Effects of Invention

In the piezoelectric valve of the present invention, the lid member, which closes the opening of the case, has the gas discharge opening, which communicates with the gas discharge path of the plate, and is welded and fixed to the front surface, where the gas discharge path of the plate opens, on the annular welded part surrounding the gas discharge opening. Therefore, it is possible to prevent air leakage from the gas discharge opening of the lid member.

According to one aspect of the present invention, in the piezoelectric valve, the lid member, which closes the opening of the case, is welded and fixed to the end surface of the case on an annular welded part on the outer peripheral part. So, if the external dimensions are limited, the case opening also would be able to take a sufficient wall thickness, so that the case opening does not swell due to the supply pressure of the compressed gas. Therefore, it is possible to prevent air leakage from the case opening.

According to another aspect of the present invention, in the piezoelectric valve, the lid member, which closes the opening of the case, has the gas discharge opening that communicates with the gas discharge path of the plate, and is welded and fixed to the front surface, where the gas discharge path of the plate opens, on the annular welded part surrounding the gas discharge opening. Therefore, after the plate welded and fixed to the lid member is disposed inside the valve main part, the lid member can be welded and fixed to the end surface of the case. This enables easy assembly.

According to another aspect of the present invention, in the piezoelectric valve, the plate is molded with the wiring for supplying power to the laminated piezoelectric element of the actuator. And also, the lid member further has a wiring opening from which the wiring exposed on the front surface of the plate extends forward, and is welded and fixed to the front surface of the plate on an annular welded part surrounding the gas discharge opening and an annular welded part surrounding the wiring opening. Therefore, it is possible to prevent air leakage from the gas discharge opening and the wiring opening of the lid member.

In addition, according to another aspect of the present invention, in the piezoelectric valve, the lid member, which closes the opening of the case, has a gas discharge opening, which communicates with the gas discharge path of the plate, and the wiring opening, from which the wiring exposed on the front surface of the plate extends forward, and is welded and fixed to the front surface of the plate, where the gas discharge path opens, on an annular welded part surrounding both the gas discharge opening and the wiring opening. Therefore, it is possible to prevent air leakage from the gas discharge opening and the wiring opening of the lid member.

According to another aspect of the present invention, in the piezoelectric valve, the lid member, which closes the opening of the case, has a gas discharge opening, which communicates with the gas discharge path of the plate, and a wiring opening, from which the wiring exposed on the front surface of the plate extends forward, and is welded and fixed to the front surface of the plate, where the gas discharge path opens, on an annular welded part surrounding both the gas discharge opening and the wiring opening. Therefore, after the plate welded and fixed to the lid member is disposed inside the valve main part, the lid member can be welded and fixed to the end surface of the case. This enables easy assembly.

According to another aspect of the present invention, in the piezoelectric valve, the lid member is welded and fixed to the front surface of the plurality of the plates. Therefore, this can prevent air leakage and make assembly easier also in the case in which the number of valves increases.

According to another aspect of the present invention, the method of manufacturing the piezoelectric valve includes providing the lid member, which closes the opening of the case, with a gas discharge opening, which communicates with the gas discharge path of the plate, and irradiating the lid member with a laser light from above along an annular locus surrounding the gas discharge opening to weld and fix the lid member to the front surface of the plate where the gas discharge path opens. Therefore, it is possible to manufacture a piezoelectric valve capable of preventing air leakage from the gas discharge opening of the lid member.

According to another aspect of the present invention, the method of manufacturing the piezoelectric valve includes irradiating the lid member with a laser light from above along the annular locus on the outer peripheral part of the lid member to weld and fix the lid member to the end surface of the case. So, if the external dimensions are limited, the case opening also would be able to take a sufficient wall thickness, so that the case opening does not swell due to the supply pressure of compressed gas. Therefore, it is possible to manufacture a piezoelectric valve capable of preventing air leakage from the case opening.

According to another aspect of the present invention, the method of manufacturing the piezoelectric valve includes: providing the lid member, which closes the opening of the case, with a gas discharge opening, which communicates with the gas discharge path of the plate; irradiating the lid member with a laser light from above along an annular locus surrounding the gas discharge opening to weld and fix the lid member to the front surface of the plate where the gas discharge path opens; and disposing the plate inside the valve main part, and subsequently irradiating the lid member with a laser light from above along the annular locus on the outer peripheral part of the lid member to weld and fix the lid member to the end surface of the case. Therefore, it is possible to assemble the piezoelectric valves easily.

According to another aspect of the present invention, the method of manufacturing the piezoelectric valve includes: molding the plate with wiring for supplying power to the laminated piezoelectric element of the actuator; further providing the lid member with a wiring opening, from which the wiring exposed to the front surface of the plate extends forward; and irradiating the lid member with a laser light from above along the annular locus surrounding the gas discharge opening and the annular locus surrounding the wiring opening to weld and fix the lid member to the front surface of the plate where the gas discharge path opens. Therefore, it is possible to manufacture the piezoelectric valve capable of preventing air leakage from the gas discharge opening and the wiring opening of the lid member.

In addition, according to another aspect of the present invention, the method of manufacturing the piezoelectric valve includes: providing the lid member, which closes the opening of the case, with the gas discharge opening, which communicates with the gas discharge path of the plate, and the wiring opening, from which the wiring exposed on the front surface of the plate extends forward; and irradiating the lid member with a laser light from above along an annular locus surrounding both the gas discharge opening and the wiring opening to weld and fix the lid member to the front surface of the plate where the gas discharge path opens. Therefore, it is possible to manufacture the piezoelectric valve capable of preventing air leakage from the gas discharge opening and the wiring opening of the lid member.

According to another aspect of the present invention, the method of manufacturing the piezoelectric valve includes: providing the lid member, which closes the opening of the case, with the gas discharge opening, which communicates with the gas discharge path of the plate, and the wiring opening, from which the wiring exposed on the front surface of the plate extends forward; irradiating the lid member with a laser light from above along an annular locus surrounding both the gas discharge opening and the wiring opening to weld and fix the lid member to the front surface of the plate where the gas discharge path opens; and disposing the plate inside the valve main part, and subsequently irradiating the lid member with a laser light from above along the annular locus on the outer peripheral part of the lid member to weld and fix the lid member to the end surface of the case. Therefore, it is possible to assemble the piezoelectric valves easily.

According to another aspect of the present invention, the method of manufacturing the piezoelectric valve includes welding and fixing the lid member to the front surface of the plurality of plates. Therefore, also in the case in which the number of valves increases, it is possible to manufacture the piezoelectric valve capable of preventing air leakage and assemble the piezoelectric valves easily.

DESCRIPTION OF EMBODIMENTS

Embodiments of the present invention is to be described with reference to the drawings.

Figure 1:
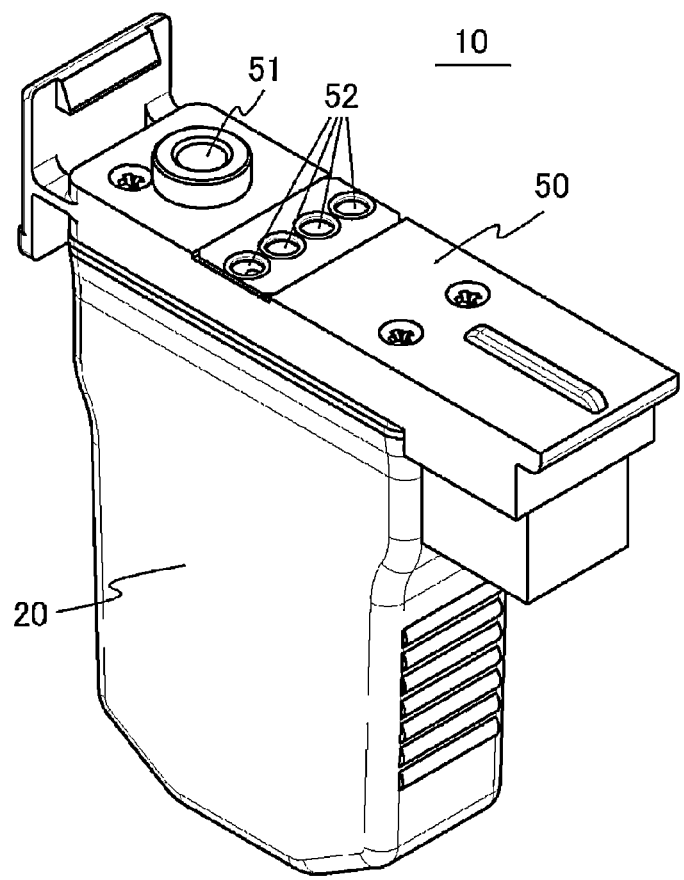
FIG. 1 is a perspective view of a piezoelectric valve.
Figure 2:
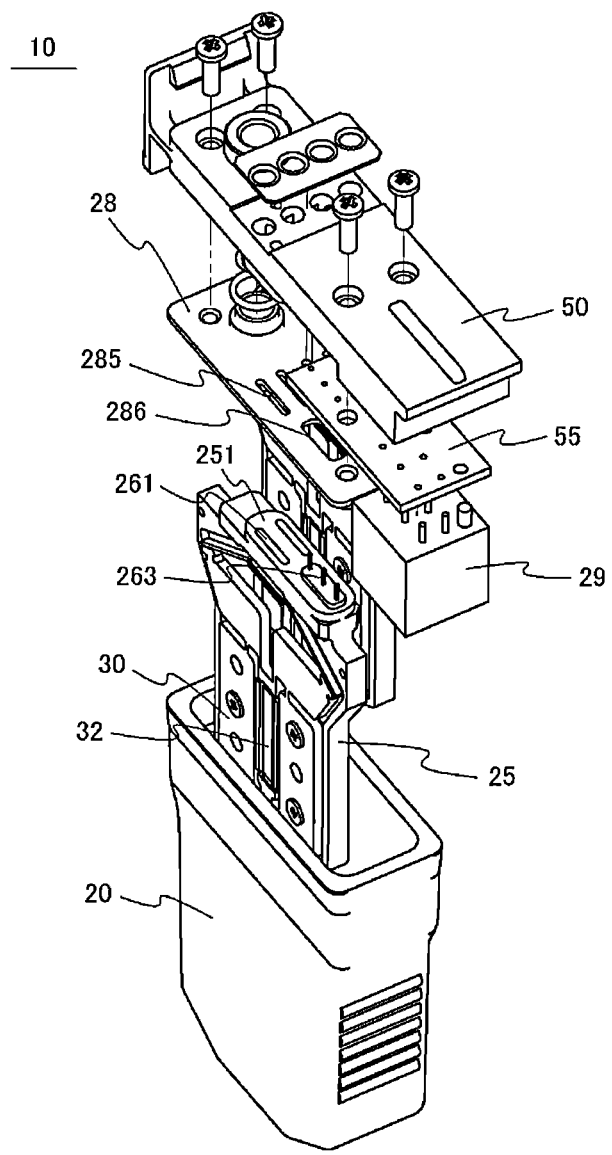
FIG. 2 is an exploded perspective view of a piezoelectric valve.
Figure 3:
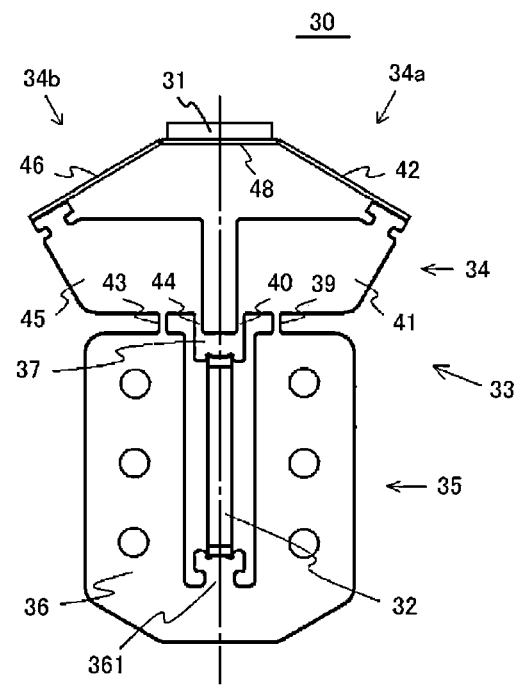
FIG. 3 is an explanatory diagram of an actuator.
Figure 4:
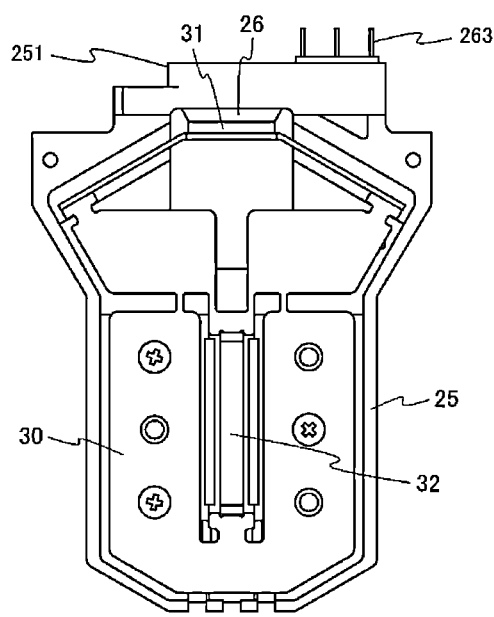
FIG. 4 is an explanatory diagram of a state in which an actuator is fixed to a valve seat plate.
Figure 5:
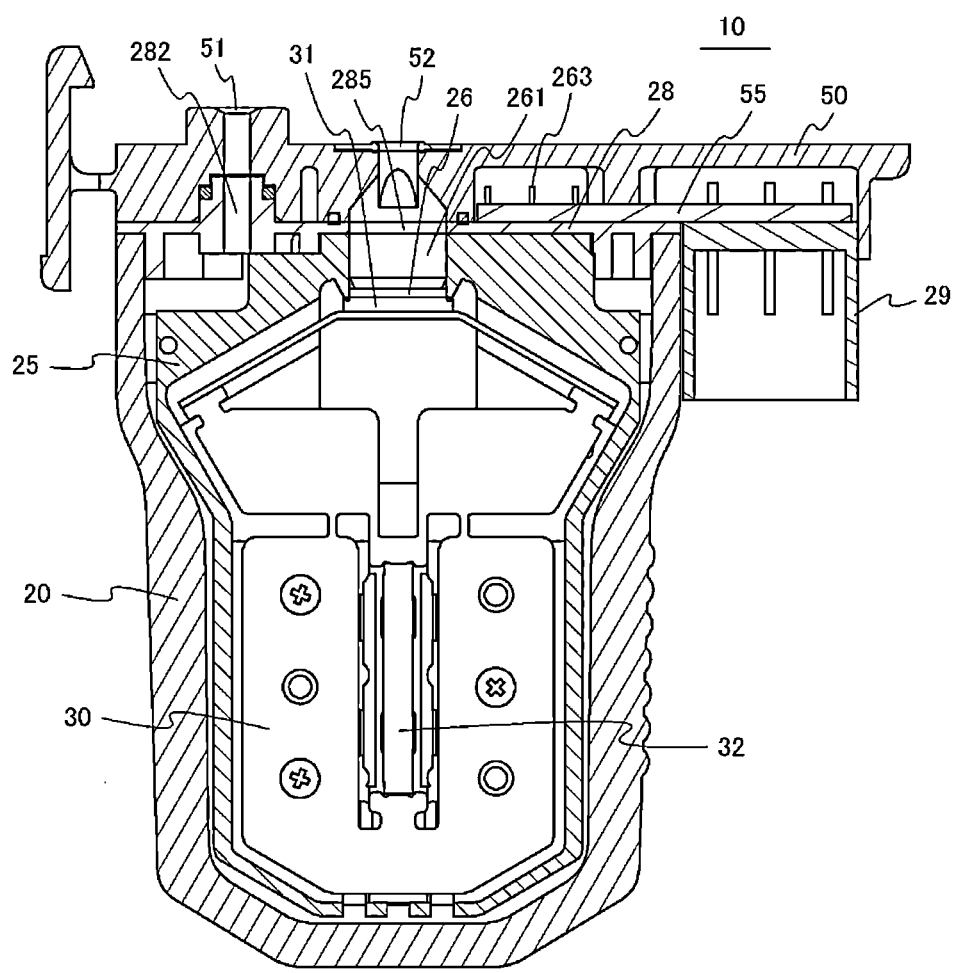
FIG. 5 is a cross-sectional view of a piezoelectric valve, and is an explanatory diagram of a state in which a valve seat plate is disposed inside a valve main part.

FIG. 1 shows a perspective view of an example of a piezoelectric valve. FIG. 2 shows an exploded perspective view of the piezoelectric valve of FIG. 1. FIG. 3 shows an explanatory diagram of an actuator. FIG. 4 shows an explanatory diagram of a state in which the actuator is fixed to a valve seat plate. FIG. 5 is a cross-sectional view of the piezoelectric valve of FIG. 1, showing an explanatory diagram of a state in which the valve seat plate is disposed inside a valve main part.

A piezoelectric valve 10 shown in FIGS. 1 to 5 includes a valve main part 20, at least one valve seat plate 25 disposed inside the valve main part 20 and fixed to the valve main part 20, an actuator 30 fixed to both sides of the valve seat plate 25 with screws.

The valve main part 20 is a case whose front surface is open, and includes a gas pressure chamber inside that receives supply of compressed gas from an external compressed gas supply source (not shown).

Furthermore, a connector portion 50 is provided on the front side of the valve main part 20. A gas suction port 51 for sucking compressed gas into the valve main part 20 and gas discharge ports 52 for discharging compressed gas are opened on the front surface of the connector portion 50.

A wiring board 55 for supplying power to a laminated piezoelectric element 32 (hereinafter referred to as "piezoelectric element") is disposed between the valve main part 20 and the connector portion 50. In addition, a wiring connector 29 for supplying power to the piezoelectric element 32 via the wiring board 55 is disposed at one side end of the connector portion 50 and at a lateral position of the valve main part 20.

The valve seat plate 25 is provided with attachment portions for the actuator 30 on both sides, and has a valve seat 26 with which a valve element 31 to be described below of the actuator 30 is in contact. In addition, the valve seat plate 25 is formed with a gas discharge path 261 through which the valve seat surface of the valve seat 26 communicates with the gas discharge port 52 of the connector portion 50. The gas discharge path 261 opens at the front surface of the front protruding portion 251 of the valve seat plate 25.

The valve seat plate 25 is formed by molding a synthetic resin material in which a wiring 263 is molded. The wiring 263 supplies power from the wiring board 55 to the piezoelectric element 32. The end of the wiring 263 is exposed to the front surface of the front protruding portion 251.

At the rear position of the valve seat plate 25, there is exposed electrodes of the wiring connected to lead wires of the piezoelectric element 32 (not shown).

A lid member 28 that closes the opening of the case of the valve main part 20 is provided on the front surface of the front protruding portion 251 of the valve seat plate 25.

The lid member 28 is formed with: a gas discharge opening 285 communicating with the gas discharge path 261 of the valve seat plate 25; and a wiring opening 286 through which the wiring 263, exposed on the front surface of the front protruding portion 251 of the valve seat plate 25, extends forward.

Furthermore, the lid member 28 is formed with a gas suction path 282 through which the gas suction port 51 that opens in the front surface of the connector portion 50 communicates with the inside of the valve main part 20.

As shown in FIG. 3, the actuator 30 includes a valve element 31 made of a rubber, preferably a rubber with lubricating properties, a piezoelectric element 32 that generates a driving force, required for operation of the valve element 31, as a displacement, and a displacement enlargement mechanism 33 that enlarges a displacement of the piezoelectric element 32 and causes it to act on the valve element 31.

The piezoelectric element 32, for example, a resin exterior type piezoelectric element can be used. The resin exterior type piezoelectric element is thinly coated with an epoxy resin over the entire peripheral surface including a lateral surface where the internal electrode layer is exposed.

The displacement enlargement mechanism 33 has a displacement enlargement portion 34 that enlarges the displacement of the piezoelectric element 32 and a displacement transmission portion 35 that transmits the displacement of the piezoelectric element 32 to the displacement enlargement portion 34. The displacement enlargement mechanism 32 is arranged symmetrically with respect to an axis in the operating direction of the valve element 31. Here, the axis is a straight line connecting the valve element 31 and the longitudinal axis of the piezoelectric element 32.

The displacement transmission portion 35 has a U-shaped base board 36 to which one end of the piezoelectric element 32 is joined, and a cap member 37 to which the other end of the piezoelectric element 32 is joined. The piezoelectric element 32 is disposed in the space of the U-shaped base board 36, so that the displacement enlargement mechanism 33 is arranged symmetrically with respect to the longitudinal axis of the piezoelectric element 32.

Here, the piezoelectric element 32 is installed in the space of the U-shaped base board 36 between a U-shaped bottom portion 361 of the base board 36 and the cap member 37, for example, via an adhesive. Here, the U-shaped bottom portion 361 of the base board 36 is plastically deformed, so that one end of the piezoelectric element 32 is joined to the U-shaped bottom portion 361 of the base board 36, and the other end of the piezoelectric element 32 is joined to the cap member 37.

The displacement enlargement portion 34 includes first and second displacement enlargement portions 34a and 34b arranged symmetrically with respect to the straight line connecting the valve element 31 and the longitudinal axis of the piezoelectric element 32.

The first displacement enlargement portion 34a has first and second hinges 39 and 40, a first arm 41, and a first leaf spring 42. The first arm 41 is integrated with one side end of the U-shaped base board 36 by the first hinge 39 and is integrated with the cap member 37 by the second hinge 40. One end of the first leaf spring 42 is joined to the outer end part of the first arm 41.

On the other hand, the second displacement enlargement portion 34b has third and fourth hinges 43 and 44, a second arm 45, and a second leaf spring 46. The second arm 45 is integrated with the other side end of the U-shaped base board 36 by the third hinge 43, and is integrated with the cap member 37 by the fourth hinge 44. One end of the second leaf spring 46 is joined to the outer end part of the second arm 45.

Here, the displacement enlargement mechanism 33 can be integrally formed by punching out a metal material such as a stainless steel material including an invar material, except for the first and second leaf springs 42 and 46, for example.

The first leaf spring 42 and the second leaf spring 46 can be formed from, for example, one sheet of metal plate material. Here, the first leaf spring 42 and the second leaf spring 46 are symmetrical with respect to the longitudinal axis of the piezoelectric element 32, and is respectively formed on opposite side portions of one sheet of metal plate material. The metal plate material is formed into a shape having an installation portion 48 of the valve element 31 in the central part. The installation portion 48 is, for example, a flat installation surface orthogonal to the longitudinal axis of the piezoelectric element 32. One end of the first leaf springs 42 and one end of the second leaf springs 46 are joined to the outer end parts of the first and second arms 41 and 45, respectively. The valve element 31 is provided on the installation portion 48 located between the other ends of the first and second leaf springs 42 and 46 and on the longitudinal axis of the piezoelectric element 32.

Note that it is also possible to: form the first leaf spring 42 and the second leaf spring 46 using separate members; and join one lateral end part of the valve element 31 to the other end of the first leaf spring 42 and join the other lateral end part of the valve element 31 to the other end of the second leaf spring 46. As a result, the valve element 31 can also be provided between the other ends of the first and second leaf springs 42 and 46.

When the piezoelectric element 32 is energized in the valve closed state of the actuator 30, the piezoelectric element 32 extends. In the displacement enlargement mechanism 33, the displacement of the piezoelectric element 32 due to the extension is enlarged by the principle of leverage with the first and third hinges 39 and 43 serving as fulcrums, the second and fourth hinges 40 and 44 serving as efforts, and the outer end parts of the first and second arms 41 and 45 serving as loads. This largely displaces the outer end parts of the first and second arms 41 and 45.

Then, the displacement of the outer end parts of the first and second arms 41 and 45 separates the valve element 31 from the valve seat 26 via the first and second leaf springs 42 and 46, and opens the gas discharge path 261.

Conversely, in the above actuator 30, when the piezoelectric element 32 is not energized, the piezoelectric element 32 contracts, and the contraction causes the valve element 31 to be seated on the valve seat 26 via the displacement enlargement mechanism 33. This closes the gas discharge path 261.

Figure 6:
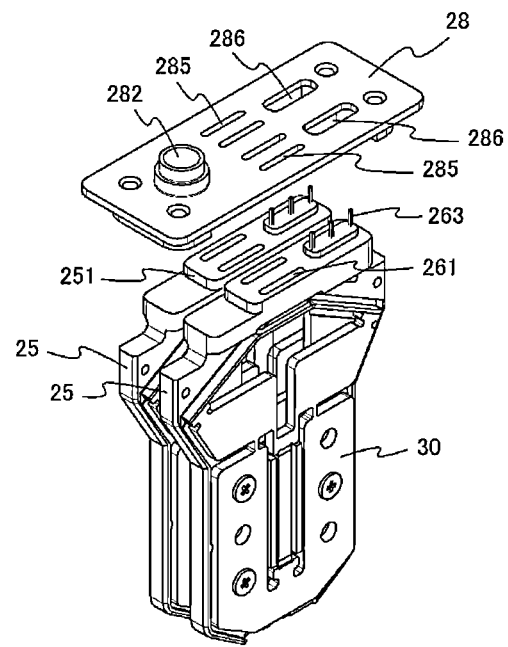
FIG. 6 is an explanatory diagram of how a lid member is welded and fixed to a front surface of the valve seat plates of FIG. 4.
Figure 7:
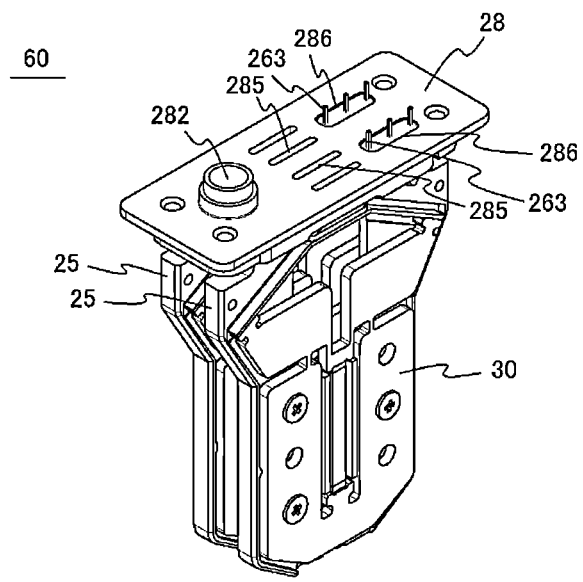
FIG. 7 is an explanatory diagram of an intermediate assembly in which lid members are welded and fixed to the front surface of the valve seat plate of FIG. 4.
Figure 8:
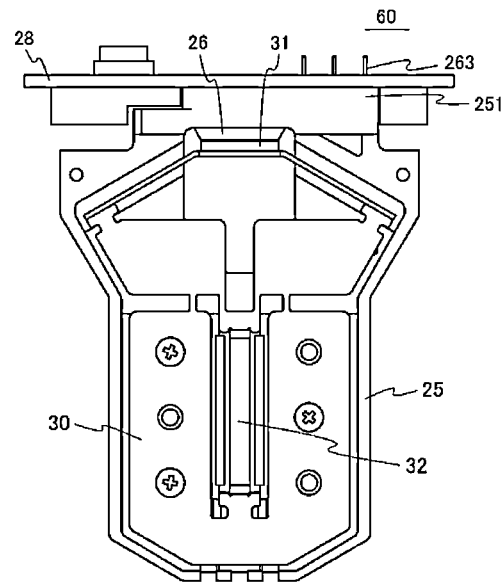
FIG. 8 is a front view of the intermediate assembly of FIG. 7.
Figure 9:
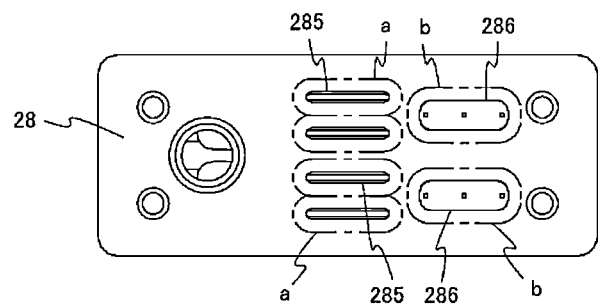
FIG. 9 is a plan view of the intermediate assembly of FIG. 7, and is an explanatory diagram of loci to be irradiated with a laser light.

FIG. 6 shows an explanatory diagram of how the lid member is welded and fixed to the front surface of the valve seat plate of FIG. 4. FIG. 7 shows an explanatory diagram of an intermediate assembly in which a lid member is welded and fixed to the front surfaces of the valve seat plates of FIG. 4. FIG. 8 shows a front view of the intermediate assembly of FIG. 7. FIG. 9 is a plan view of the intermediate assembly of FIG. 7, and shows an explanatory diagram of loci to be irradiated with a laser light.

In the embodiment of the present invention, the lid member 28, which closes the opening of the case of the valve main part 20, is irradiated with a laser light along the scanning loci shown in FIG. 9, so that the lid member 28 is welded and fixed to the front surfaces of the front protruding portions 251 of the valve seat plates 25. Thus, the intermediate assembly 60 is assembled. Here, an example is shown in which two valve seat plates 25 are welded and fixed to the lid member 28 to form an intermediate assembly 60.

First, wiring 263, exposed on the front surface of the front protruding portion 251 of each valve seat plate 25, is inserted into each of the two wiring openings 286 formed in the lid member 28, and is extended forward. In addition, the four gas discharge openings 285 formed in the lid member 28 are positioned on the gas discharge paths 261 of the valve seat plates 25, and the lower surface of the lid member 28 is brought into contact with the front surface of the front protruding portion 251 of each valve seat plate 25.

Next, as shown in FIG. 9, a laser head irradiates the lid member 28 with a laser light from above along the annular scanning loci a respectively surrounding the four gas discharge openings 285. As a result, the lid member 28 is welded and fixed to the front surface of the front protruding portion 251 of each valve seat plate 25 on the annular welded part surrounding each gas discharge opening 285. In addition, a laser head irradiates the lid member 28 with a laser light from above along the annular scanning loci b respectively surrounding the two wiring openings 286. As a result, the lid member 28 is welded and fixed to the front surface of the front protruding portion 251 of each valve seat plate 25 on the annular welded part surrounding each wiring opening 286.

Figure 10:
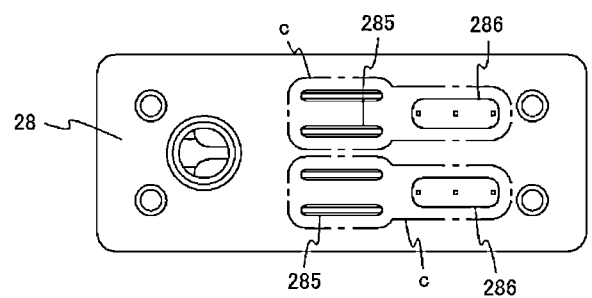
FIG. 10 is a plan view of the intermediate assembly of FIG. 7, and is an explanatory diagram of another example of loci to be irradiated with a laser light.

FIG. 10 is a plan view of the intermediate assembly of FIG. 7, and shows an explanatory diagram of another example of loci to be irradiated with a laser light.

In the embodiment of the present invention, the lid member 28, which closes the opening of the case of the valve main part 20, may be irradiated with a laser light along the scanning loci shown in FIG. 10, so that the lid member 28 is welded and fixed to the front surfaces of the front protruding portions 251 of the valve seat plates 25. Thus, the intermediate assembly 60 may be assembled.

In that case, as shown in FIG. 10, a laser head irradiates the lid member 28 with a laser light from above along an annular scanning locus c surrounding all of the two gas discharge openings 285 and one wiring opening 286 for each valve seat plate 25. As a result, the lid member 28 is welded and fixed to the front surface of the front protruding portion 251 of each valve seat plate 25, on an annular welded part surrounding both the gas discharge openings 285 and the wiring opening 286 for each valve seat plate 25.

Note that the scanning loci a and b shown in FIG. 9 and the scanning loci c shown in FIG. 10 may also be combined to weld and fix the lid member 28 to front surfaces of the valve seat plates 25 for assembling the intermediate assembly 60.

Figure 11:
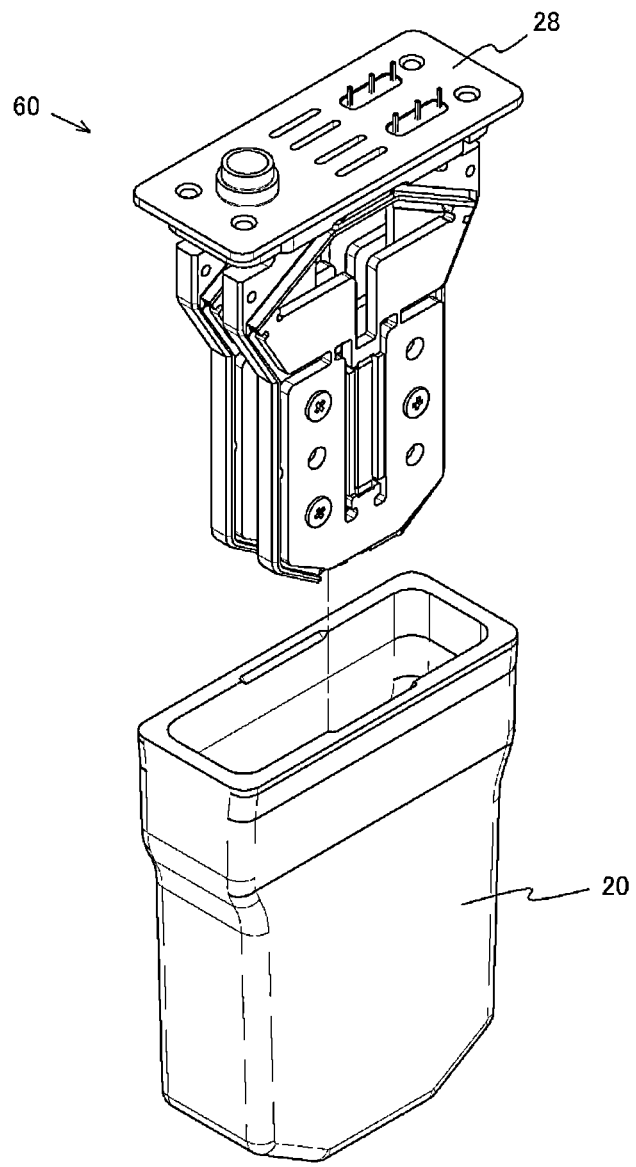
FIG. 11 is an explanatory diagram of how the intermediate assembly of FIG. 7 is assembled to a valve main part.
Figure 12:
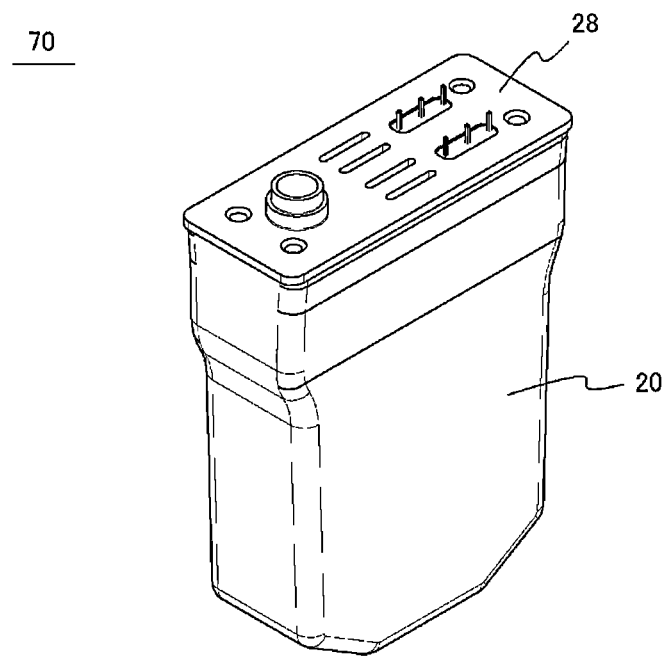
FIG. 12 is an explanatory diagram of a valve assembly in which the intermediate assembly of FIG. 7 is assembled to a valve main part and welded and fixed.
Figure 13:
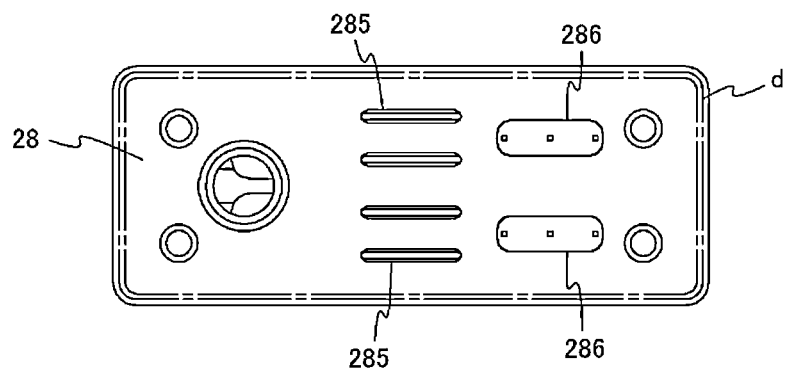
FIG. 13 is a plan view of the valve assembly of FIG. 12, and is an explanatory diagram of a locus to be irradiated with a laser light.

FIG. 11 shows an explanatory diagram of how the intermediate assembly of FIG. 7 is assembled to the valve main part. FIG. 12 shows an explanatory diagram of the valve assembly in which the intermediate assembly of FIG. 7 is assembled to the valve main part, and welded and fixed thereto. FIG. 13 is a plan view of the valve assembly of FIG. 12, and shows an explanatory diagram of a locus to be irradiated with a laser light.

In the embodiment of the present invention, the lid member 28 of the intermediate assembly 60 is irradiated with a laser light along the scanning locus shown in FIG. 13, so that the lid member 28 is welded and fixed to the end surface of the case of the valve main part 20. Thus, the valve assembly 70 is assembled.

In the embodiment of the present invention, the valve seat plate 25 of the intermediate assembly 60 is disposed inside the valve main part 20, and then a laser head irradiates the lid member 28 with a laser light from above along the annular scanning locus d on the outer peripheral part of the lid member 28 as shown in FIG. 13. Then, the lid member 28 is welded and fixed to the end surface of the case on the annular welded part on the outer peripheral part.

In the example shown in FIG. 13, a double scanning locus d is shown, but the present invention is not limited to this, and can be changed according to conditions such as laser output and scanning speed.

In the embodiment of the present invention, a well-known light-transmitting resin material that sufficiently transmits laser light can be used for the lid member 28. In addition, a well-known light-absorbing resin material that sufficiently absorbs laser light can be used for the valve seat plate 25 and the valve main part 20.

In the above embodiments of the present invention, an example is shown in which the two valve seat plates 25 are welded and fixed to the lid member 28 to assemble the intermediate assembly 60, but the present invention is not limited to this. The intermediate assembly 60 may be assembled by welding and fixing one valve seat plate 25 to the lid member 28. Alternatively, the intermediate assembly 60 can be assembled by welding and fixing three or more valve seat plates 25 to the lid member 28.

In the piezoelectric valve according to the embodiment of the present invention, the lid member 28, which closes the opening of the case of the valve main part 20, has a gas discharge opening 285 communicating with the gas discharge path 261 of the valve seat plate 25 and a wiring opening 286 through which the wiring 263 exposed on the front surface of the valve seat plate 25 extends forward. In addition, the lid member 28 is welded and fixed to the front surface of the front protruding portion 251, where the gas discharge path 261 of the valve seat plate 25 opens, on an annular welded part surrounding the gas discharge opening 285 and an annular welded part surrounding the wiring opening 286. Therefore, it is possible to prevent air leakage from the gas discharge opening 285 and the wiring opening 286 of the lid member 28.

In addition, in the piezoelectric valve according to the embodiment of the present invention, the lid member 28, which closes the opening of the case of the valve main part 20, has a gas discharge opening 285 communicating with the gas discharge path 261 of the valve seat plate 25, and a wiring opening 286 through which the wiring 263 exposed on the front surface of the valve seat plate 25 extends forward. Therefore, if the lid member 28 is welded and fixed to the front surface of the front protruding portion 251, through which the gas discharge path 261 of the valve seat plate 25 opens, on an annular welded part surrounding both the gas discharge opening 285 and the wiring opening 286, it would also be possible to prevent air leakage from the gas discharge opening 285 and the wiring opening 286 of the lid member 28.

In the piezoelectric valve according to the embodiment of the present invention, the lid member 28, which closes the opening of the case of the valve main part 20, is welded and fixed to the end surface of the case on an annular welded part on the outer peripheral part. So, if the external dimensions are limited, the case opening would be able to take a sufficient wall thickness to allow the case opening not to swell due to the supply pressure of the compressed gas. This enables preventing air leakage from the case opening.

In the piezoelectric valve according to the embodiment of the present invention, the lid member 28, which closes the opening of the case of the valve main part 20, is welded and fixed to the front surface of the front protruding portion 251 of the valve seat plate 25 to form an intermediate assembly 60. As a result, the valve seat plate 25 of the intermediate assembly 60 is disposed inside the valve main part 20, and subsequently the lid member 28 is welded and fixed to the end surface of the case to form a valve assembly 70. This enables easy assembly.

In the piezoelectric valve according to the embodiment of the present invention, three or more valve seat plates 25 can be welded and fixed to the lid member 28 that closes the opening of the case of the valve main part 20. Therefore, if the number of valves increases, the piezoelectric valve would also be able to prevent air leakage and be easily assembled.

Although the embodiments of the present invention are described above, it goes without saying that the present invention is not limited to the above embodiments, and the configurations thereof can be appropriately changed as long as it does not deviate from the scope of the invention.

INDUSTRIAL APPLICABILITY

The piezoelectric valve of the present invention can be used for a piezoelectric valve that opens and closes the valve by utilizing displacement of the laminated piezoelectric element.

The invention claimed is:

1. A piezoelectric valve comprising:
a valve main part including a gas pressure chamber that receives compressed gas supplied from an outside;
a plate disposed inside the valve main part; and
an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element,
wherein the valve main part is a case with an opening on a front surface;
the plate is provided with the gas discharge path and a valve seat with which the valve element of the actuator comes into contact, the actuator opening and closing the gas discharge path; and
a lid member that closes the opening of the case has a gas discharge opening communicating with the gas discharge path of the plate, is welded and fixed without a gasket to a front surface of the plate on an annular welded part surrounding the gas discharge opening, and is welded and fixed without a gasket to an end surface of the case on an annular welded part on an outer peripheral part, the front surface of the plate being a surface where the gas discharge path opens.

2. The piezoelectric valve according to claim 1, wherein:
the plate is molded with wiring for supplying power to the laminated piezoelectric element of the actuator; and
the lid member further includes a wiring opening from which the wiring exposed on the front surface of the plate extends forward, and is welded and fixed without a gasket to the front surface of the plate on an annular welded part surrounding the gas discharge opening and an annular welded part surrounding the wiring opening.

3. A piezoelectric valve comprising:
a valve main part including a gas pressure chamber that receives compressed gas supplied from an outside;
a plate disposed inside the valve main part; and
an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element,
wherein the valve main part is a case with an opening on a front surface;
the plate is provided with the gas discharge path and a valve seat with which the valve element of the actuator comes into contact, and is molded with wiring for supplying power to the laminated piezoelectric element of the actuator, the actuator opening and closing the gas discharge path; and
a lid member that closes the opening of the case includes a gas discharge opening and a wiring opening, is welded and fixed without a gasket to the front surface of the plate on an annular welded part surrounding the gas discharge opening and the wiring opening, and is welded and fixed without a gasket to an end surface of the case on an annular welded part on an outer peripheral part, the gas discharge opening communicating with the gas discharge path of the plate, the wiring opening being an opening from which the wiring exposed on a front surface of the plate extends forward, the front surface of the plate being a surface where the gas discharge path opens.

4. The piezoelectric valve according to claim 1, wherein the lid member is welded and fixed without a gasket to the front surfaces of a plurality of the plates.

5. A method of manufacturing a piezoelectric valve, the piezoelectric valve including a valve main part including a gas pressure chamber that receives compressed gas supplied from an outside; a plate disposed inside the valve main part; and an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element, the method comprising:
configuring the valve main part to be a case with an opening on a front surface;
providing the plate with the gas discharge path and a valve seat with which the valve element of the actuator comes into contact, the actuator opening and closing the gas discharge path;
providing a lid member with a gas discharge opening that communicates with the gas discharge path of the plate, the lid member closing the opening of the case; and irradiating the lid member with a laser light from above along an annular locus surrounding the gas discharge opening to weld and fix without a gasket the lid member to a front surface of the plate where the gas discharge path opens, disposing the plate inside the valve main part, and subsequently irradiating the lid member with a laser light from above along an annular locus on an outer peripheral part of the lid member to weld and fix without a gasket the lid member to an end surface of the case.

6. The method of manufacturing a piezoelectric valve according to claim 5, further comprising:

molding the plate with the wiring for supplying power to the laminated piezoelectric element of the actuator;

further providing the lid member with a wiring opening from which the wiring exposed on the front surface of the plate extends forward; and irradiating the lid member with a laser light from above along the annular locus surrounding the gas discharge opening and an annular locus surrounding the wiring opening to weld and fix without a gasket the lid member to the front surface of the plate where the gas discharge path opens, and disposing the plate inside the valve main part.

7. A method of manufacturing a piezoelectric valve, the piezoelectric valve including a valve main part including a gas pressure chamber that receives compressed gas supplied from an outside; a plate disposed inside the valve main part; and an actuator, fixed to the plate and disposed inside the valve main part together with the plate, including a valve element that opens and closes a gas discharge path for discharging compressed gas from the gas pressure chamber, a laminated piezoelectric element that generates a driving force as a displacement, and a displacement enlargement mechanism, the driving force being required for operation of the valve element, the displacement enlargement mechanism enlarging the displacement of the laminated piezoelectric element and causing the enlarged displacement to act on the valve element, the method comprising:

configuring the valve main part to be a case with an opening on a front surface;

providing the plate with the gas discharge path and a valve seat with which the valve element of the actuator comes into contact, and molding the plate with wiring for supplying power to the laminated piezoelectric element of the actuator, the actuator opening and closing the gas discharge path;

providing a lid member with a gas discharge opening and a wiring opening, the lid member closing the opening of the case, the gas discharge opening communicating with the gas discharge path of the plate, the wiring opening being an opening from which the wiring exposed on a front surface of the plate extends forward; and irradiating the lid member with a laser light from above along an annular locus surrounding the gas discharge opening and the wiring opening to weld and fix the lid member to the front surface of the plate where the gas discharge path opens, disposing the plate inside the valve main part, and subsequently irradiating the lid member with a laser light from above along an annular locus on an outer peripheral part of the lid member to weld and fix the lid member to an end surface of the case.

8. The method of manufacturing a piezoelectric valve according to claim 5, wherein the lid member is welded and fixed without a gasket to the front surfaces of a plurality of the plates.

9. The piezoelectric valve according to claim 3, wherein the lid member is welded and fixed without a gasket to the front surfaces of a plurality of the plates.

10. The method of manufacturing a piezoelectric valve according to claim 7, wherein the lid member is welded and fixed without a gasket to the front surfaces of a plurality of the plates.

\* \* \* \* \*